(12) United States Patent
Jinnou et al.

(10) Patent No.: US 11,351,608 B2
(45) Date of Patent: Jun. 7, 2022

(54) SINTERED BEARING AND MANUFACTURING METHOD FOR SAME

(71) Applicant: NTN CORPORATION, Osaka (JP)

(72) Inventors: Makoto Jinnou, Mie (JP); Natsuhiko Mori, Mie (JP); Yoshinori Ito, Aichi (JP)

(73) Assignee: NTN CORPORATION, Osaka (JP)

( * ) Notice: Subject to any disclaimer, the term of this patent is extended or adjusted under 35 U.S.C. 154(b) by 654 days.

(21) Appl. No.: 15/944,271

(22) Filed: Apr. 3, 2018

(65) Prior Publication Data

US 2018/0221956 A1    Aug. 9, 2018

Related U.S. Application Data

(62) Division of application No. 14/384,844, filed as application No. PCT/JP2013/057079 on Mar. 13, 2013, now abandoned.

(30) Foreign Application Priority Data

| Mar. 13, 2012 | (JP) | 2012-055709 |
| Mar. 13, 2012 | (JP) | 2012-055711 |

(Continued)

(51) Int. Cl.
*B22F 5/00* (2006.01)
*C22C 9/01* (2006.01)
(Continued)

(52) U.S. Cl.
CPC .......... *B22F 5/00* (2013.01); *B22F 1/105* (2022.01); *B22F 3/1003* (2013.01); *B22F 3/11* (2013.01);
(Continued)

(58) Field of Classification Search
CPC .................................. B22F 5/106; B22F 3/11
See application file for complete search history.

(56) References Cited

U.S. PATENT DOCUMENTS

| 5,225,155 A * | 7/1993 | Hampton | B22F 3/10 |
| | | | 419/38 |
| 6,132,486 A * | 10/2000 | Dixon | B22F 3/1007 |
| | | | 419/27 |

(Continued)

FOREIGN PATENT DOCUMENTS

| JP | 56-152902 | 11/1981 |
| JP | 64-3322 | 1/1989 |

(Continued)

OTHER PUBLICATIONS

ASM International Handbook Committee. (1998). ASM Handbook, vol. 07—Powder Metal Technologies and Applications. (pp. 453-459). ASM International. (Year: 1998).*

(Continued)

*Primary Examiner* — Anthony M Liang
(74) *Attorney, Agent, or Firm* — Wenderoth, Lind & Ponack, L.L.P.

(57) ABSTRACT

Provided is a sintered bearing (1), including 3 to 12% by mass of aluminum, 0.05 to 0.5% by mass of phosphorus, and the balance including copper as a main component, and inevitable impurities, the sintered bearing (1) having a structure in which an aluminum-copper alloy is sintered with a sintering aid added to raw material powder, a pore (db, do) in a surface layer portion of the sintered bearing (1) being formed smaller than an internal pore (di).

18 Claims, 7 Drawing Sheets

(30) Foreign Application Priority Data

| Mar. 6, 2013 | (JP) | ................................. 2013-044224 |
|---|---|---|
| Mar. 6, 2013 | (JP) | ................................. 2013-044227 |

(51) Int. Cl.

| *F16C 33/14* | (2006.01) |
|---|---|
| *C22C 1/08* | (2006.01) |
| *B22F 5/10* | (2006.01) |
| *B22F 3/11* | (2006.01) |
| *B22F 3/10* | (2006.01) |
| *F16C 33/12* | (2006.01) |
| *C22C 9/10* | (2006.01) |
| *C22C 1/10* | (2006.01) |
| *B22F 1/105* | (2022.01) |
| *B22F 3/12* | (2006.01) |
| *B22F 3/24* | (2006.01) |
| *F16C 33/10* | (2006.01) |
| *B22F 3/02* | (2006.01) |

(52) U.S. Cl.
CPC .................. *B22F 3/12* (2013.01); *B22F 3/24* (2013.01); *B22F 5/10* (2013.01); *B22F 5/106* (2013.01); *C22C 1/08* (2013.01); *C22C 1/10* (2013.01); *C22C 9/01* (2013.01); *C22C 9/10* (2013.01); *F16C 33/104* (2013.01); *F16C 33/128* (2013.01); *F16C 33/145* (2013.01); *B22F 3/02* (2013.01); *B22F 2201/01* (2013.01); *B22F 2301/10* (2013.01); *B22F 2302/40* (2013.01); *B22F 2302/45* (2013.01); *F16C 2204/10* (2013.01); *F16C 2204/20* (2013.01)

(56) References Cited

U.S. PATENT DOCUMENTS

| 2002/0025092 | A1 | 2/2002 | Maruyama et al. | |
| 2002/0197149 | A1* | 12/2002 | Kanezaki | F16C 33/121 |
| | | | | 415/55.1 |
| 2003/0206670 | A1 | 11/2003 | Maruyama et al. | |
| 2004/0071374 | A1 | 4/2004 | Tomita et al. | |
| 2008/0181542 | A1* | 7/2008 | Gomyo | F16C 17/107 |
| | | | | 384/100 |
| 2008/0199115 | A1 | 8/2008 | Shimizu et al. | |
| 2009/0011268 | A1 | 1/2009 | Shimizu et al. | |
| 2009/0311129 | A1 | 12/2009 | Harakawa et al. | |
| 2010/0307006 | A1 | 12/2010 | Shimizu et al. | |

FOREIGN PATENT DOCUMENTS

| JP | 11-182551 | | 7/1999 |
| JP | 2002-122142 | | 4/2002 |
| JP | 2004-18941 | | 1/2004 |
| JP | 2004-100851 | | 4/2004 |
| JP | 2006-258185 | | 9/2006 |
| JP | 2007-197834 | | 8/2007 |
| JP | 2008-240910 | | 10/2008 |
| JP | 2009-7650 | | 1/2009 |
| JP | 2009-114486 | | 5/2009 |
| JP | 2009114486 | A * | 5/2009 |
| JP | 4521871 | | 8/2010 |
| KR | 10-0816978 | | 3/2008 |

OTHER PUBLICATIONS

International Search Report dated Jun. 18, 2013 in International (PCT) Application No. PCT/JP2013/057079.

International Preliminary Report on Patentability and Written Opinion of the International Searching Authority issued Sep. 16, 2014 in International (PCT) Application No. PCT/JP2013/057079.

Office Action dated Jun. 15, 2016 in corresponding Japanese Application No. 2013-044224, with English translation.

Extended European Search Report dated Jul. 28, 2016 in corresponding European Application No. 13760718.0.

Lin et al., Effects of Powder Shape and Processing Parameters on Heat Dissipation of Heat Pipes with Sintered Porous Wicks, Material Transactions, vol. 50, No. 10, 2009, pp. 2427-2434.

* cited by examiner

SINTERED BEARING AND MANUFACTURING METHOD FOR SAME

TECHNICAL FIELD

The present invention relates to a sintered bearing that is excellent in corrosion resistance and abrasion resistance and has high strength, and to a manufacturing method for the sintered bearing.

BACKGROUND ART

Hitherto, for example, in an engine using gasoline or light oil as fuel, a motor-type fuel pump has been used. In recent years, engines including a motor-type fuel pump using fuel such as gasoline or light oil have been widely used in various parts of the world. Gasoline, light oil, and the like of a variety of quality have been used in regions of the world, and gasoline of inferior quality has been used in many regions. As one kind of gasoline of inferior quality, gasoline containing an organic acid is known. In the case of using a copper-based sintered bearing in a motor-type fuel pump, the copper-based sintered bearing is corroded with the organic acid contained in such gasoline of inferior quality. This corrosion occurs on the periphery of an opening of a pore that is opened on a bearing surface and an inner surface of the pore, and further occurs on an inner surface of a pore that is present inside the bearing and communicates with the inside from the surface, for example. This degrades the strength of the bearing, with the result that the life of the copper-based sintered bearing becomes short.

Further, in recent years, engines for automobiles and the like are being miniaturized and reduced in weight actively. Along with this, there is also a demand for miniaturization and reduction in weight of fuel pumps, and sintered bearings to be incorporated in the fuel pumps are also required to be compact. For example, in order to miniaturize a motor-type fuel pump while ensuring discharge performance thereof, it is necessary to increase the number of rotations. Along with this, fuel such as gasoline introduced into a fuel pump passes through a flow path of a narrow gap at high speed. Under such a condition, a sintered bearing is required to have further high strength and abrasion resistance as well as compactness. Therefore, although a related-art copper-based sintered bearing has high strength, the abrasion resistance thereof is not sufficient.

As a sintered bearing to be used for such a purpose, for example, Patent Document 1 discloses a Cu—Ni—Sn—C—P-based sintered bearing.

On the other hand, as a sintered bearing excellent in mechanical characteristics and corrosion resistance, an aluminum bronze-based sintered bearing is known. This sintered bearing has a problem in that aluminum oxide covering the surface of aluminum-containing copper alloy powder to be generated during sintering inhibits sintering, and hence a sintered compact having sufficient strength cannot be obtained easily. Patent Document 2 discloses a technology regarding mixed powder for sintered aluminum-containing copper alloy and a manufacturing method for the mixed powder in order to solve the above-mentioned problem.

PRIOR ART DOCUMENTS

Patent Documents

Patent Document 1: JP 4521871 B2
Patent Document 2: JP 2009-7650 A

SUMMARY OF THE INVENTION

Problems to be Solved by the Invention

In the Cu—Ni—Sn—C—P-based sintered bearing disclosed in Patent Document 1, although strength and abrasion resistance are enhanced, corrosion resistance cannot be considered to be sufficient. Further, the sintered bearing contains Ni, which is a rare metal, and hence involves a problem in terms of cost as well.

The aluminum-containing copper alloy powder disclosed in Patent Document 2 is excellent in forming ability and sintering property. However, a further study is necessary in order to obtain a product suitable for mass production satisfying stable mechanical characteristics, compactness, and reduction in cost as an aluminum bronze-based sintered bearing using the aluminum-containing copper alloy powder.

In view of the problems of the related art, it is an object of the present invention to provide an aluminum bronze-based sintered bearing in which corrosion resistance, and mechanical characteristics such as strength and abrasion resistance are enhanced, and compactness and reduction in cost are realized and to provide a manufacturing method for the aluminum bronze-based sintered bearing, which has good productivity and low cost, and thus is suitable for mass production.

Solutions to the Problems

The inventors of the present invention variously studied so as to achieve the above-mentioned object, and as a result, reached a novel concept of effectively using the expansion by sintering in order to enhance a bearing function and realize compactness and reduction in cost in an aluminum bronze-based sintered bearing, and a novel concept of effectively using the expansion by sintering in order to realize a manufacturing method that has good productivity and low cost, and thus is suitable for mass production, as a manufacturing method for the aluminum bronze-based sintered bearing.

A sintered bearing according to one embodiment of the present invention as a technical solution for achieving the above-mentioned object is a sintered bearing, comprising 3 to 12% by mass of aluminum, 0.05 to 0.5% by mass of phosphorus, and the balance comprising copper as a main component, and inevitable impurities, the sintered bearing having a structure in which an aluminum-copper alloy is sintered with a sintering aid added to raw material powder, a pore in a surface layer portion of the sintered bearing being formed smaller than an internal pore. Thus, corrosion resistance, mechanical characteristics such as strength and abrasion resistance, oil film formation property, and oil holding property can be enhanced, and compactness and reduction in cost can be realized.

Further, a manufacturing method for a sintered bearing according to one embodiment of the present invention is a manufacturing method for a sintered bearing comprising 3 to 12% by mass of aluminum, 0.05 to 0.5% by mass of phosphorus, and the balance comprising copper as a main component, and inevitable impurities, the manufacturing method comprising at least: a green compact forming step of forming a green compact in which a sintering aid is added to raw material powder; a sintering step of obtaining, from the green compact, a sintered compact having a structure in which an aluminum-copper alloy is sintered; and a sizing step of subjecting the sintered compact to dimension shaping. Thus, it is possible to achieve a manufacturing method for the aluminum bronze-based sintered bearing, which has good productivity and low cost, and thus is suitable for mass production. In the sintered bearing manufactured by the manufacturing method, corrosion resistance, mechanical characteristics such as strength and abrasion resistance, oil film formation property, and oil holding property can be enhanced, and compactness can be realized.

It is preferred that the content of aluminum be from 3 to 12% by mass. It is not preferred that the content of aluminum be less than 3% by mass, because the effects of corrosion resistance and abrasion resistance as the aluminum bronze-based sintered bearing are not obtained, and the expansion of the sintered compact is small. On the other hand, it is not preferred that the content of aluminum be more than 12% by mass, because sintering does not occur easily and the sintered compact expands too much.

It is preferred that the blending amount of phosphorus be from 0.05 to 0.5% by mass. It is not preferred that the blending amount of phosphorus be less than 0.05% by mass, because the sintering accelerating effect between a solid phase and a liquid phase is unsatisfactory. On the other hand, it is not preferred that the blending amount of phosphorus be more than 0.5% by mass, because sintering proceeds excessively, and aluminum is segregated to increase the precipitation of a Y-phase, with the result that a sintered compact becomes brittle. In an alloy phase of copper and aluminum, a β-phase is changed to a Y-phase at eutectoid temperature (565° C.).

Sintering can be accelerated to enhance strength by adding 1 to 4% by mass of silicon and 0.5 to 2% by mass of tin as the sintering aid to the raw material powder.

It is preferred that the blending amount of silicon be from 1 to 4% by mass. When the blending amount of silicon is less than 1% by mass, the amount of a liquid phase to be generated is small, and the liquid phase sintering acceleration effect at low temperature becomes insufficient, with the result that a sintered compact that is dense and has appropriate hardness cannot be obtained. On the other hand, it is not preferred that the blending amount of silicon be more than 4% by mass, because a sintered compact to be obtained is hard and brittle.

It is preferred that the blending amount of tin be from 0.5 to 2% by mass. It is not preferred that the blending amount of tin be less than 0.5% by mass, because the effect of raising a green compact density by the addition of tin powder cannot be obtained. On the other hand, it is not preferred that the blending amount of tin be more than 2% by mass, because a high concentration of tin is precipitated in a grain boundary, which degrades the quality of outer appearance of a sintered compact.

Further, when a total of 0.05 to 0.2% by mass of aluminum fluoride and calcium fluoride is added as the sintering aid to a total of 100% by mass of raw material powder comprising aluminum, phosphorus, and the balance comprising copper as a main component, and inevitable impurities, the sintering aid can react with aluminum oxide to be generated during an increase in temperature of sintering to break an aluminum oxide film, thereby accelerating sintering. It is preferred that the total blending amount of aluminum fluoride and calcium fluoride be from 0.05 to 0.2% by mass. When the total blending amount of aluminum fluoride and calcium fluoride is less than 0.05% by mass, the effect as the sintering aid is insufficient, and a sintered compact that is dense and has appropriate hardness cannot be obtained. On the other hand, when the total blending amount of aluminum fluoride and calcium fluoride is more than 0.2% by mass, the effect as the sintering aid is not enhanced even when the blending amount is increased any more, and hence it is preferred that the total blending amount of aluminum fluoride and calcium fluoride be limited to 0.2% by mass or less from the viewpoint of cost.

When the aluminum fluoride and calcium fluoride are used as the sintering aid, it is preferred that zinc be added in an amount of from 2 to 4% by mass. Zinc has a low melting point, and accelerates the sintering of copper and aluminum and further the diffusion of aluminum. Zinc is further excellent in corrosion resistance. When the blending amount of zinc is less than 2% by mass, the accelerating effects on the sintering of copper and aluminum and the diffusion of aluminum cannot be obtained. On the other hand, it is not preferred that the blending amount of zinc be more than 4% by mass, because zinc evaporates to contaminate a sintering furnace during sintering, and aluminum is segregated to be prevented from being diffused.

Further, it is preferred that silicon be added in an amount of from 0.5 to 3% by mass. Silicon generates a copper silicon-based liquid phase with respect to a phase of inhibiting the progress of sintering formed during a sintering step, thereby accelerating sintering. Silicon accelerates the diffusion of aluminum during the sintering step and hence reduces the amount of aluminum to decrease a Y-phase. It is preferred that the blending amount of silicon be from 0.5 to 3% by mass. When the blending amount of silicon is less than 0.5% by mass, the accelerating effect on the diffusion of aluminum during the sintering step is insufficient, and along with this, the decreasing effect on a Y-phase becomes insufficient. On the other hand, when the blending amount of silicon is more than 3% by mass, silicon effects a reaction during an increase in temperature of sintering to oxidize aluminum in black, which causes inconvenience of discoloration.

It is preferred that the raw material powder of copper mainly comprise electrolytic copper powder. The electrolytic copper powder has a dendritic shape. Therefore, the electrolytic copper powder can diffuse aluminum sufficiently into copper, and is excellent in forming ability, sintering property, and sliding characteristic.

1 to 5% by mass of graphite may be added with respect to a total of 100% by mass of the raw material powder and the inevitable impurities. Thus, graphite is present as free graphite in dispersed and distributed pores and imparts excellent lubricity to a sintered bearing. As a result, abrasion resistance can be further enhanced. It is preferred that the blending amount of graphite be from 1 to 5% by mass. When the blending amount of graphite is less than 1% by mass, the enhancing effects on lubricity and abrasion resistance through the addition of graphite cannot be obtained. On the other hand, it is not preferred that the blending amount of graphite be more than 5% by mass, because strength is decreased.

It is preferred that the sintered bearing have a compressed layer in a surface layer, the compressed layer have a density ratio $\alpha_1$ higher than a density ratio $\alpha_2$ of the inside, the density ratio $\alpha_1$ be $80\% \leq \alpha_1 \leq 95\%$, and a ratio $T/D_1$ of an average value T of depths of the compressed layer to an inner diameter dimension $D_1$ of the bearing surface be $\frac{1}{100} \leq T/D_1 \leq \frac{1}{15}$. Herein, the density ratio $\alpha$ is represented by the following expression:

$$\alpha(\%) = (\rho_1/\rho_0) \times 100$$

where $\rho_1$ represents a density of a porous body, and $\rho_0$ represents a density in the case where it is assumed that the porous body has no micropores.

According to the above-mentioned configuration, mechanical characteristics such as strength and abrasion resistance can be enhanced, and corrosion resistance, oil film formation property, and oil holding property can be enhanced in a green compact design.

It is preferred that, in an outer surface of the sintered bearing, a pore on a bearing surface be formed larger than a pore on the remaining outer surface. Thus, corrosion resistance and oil film formation property can be enhanced on the bearing surface on a radially inner surface side, and on the other hand, corrosion resistance and oil holding property can be enhanced on a radially outer surface and an end surface close to a closed state.

A satisfactory lubrication state can be obtained from the beginning of an operation by using an oil-impregnated bearing as the sintered bearing. As a lubricant, mineral oil, poly-α-olefin (PAO), an ester, liquid grease, or the like can be used.

As a sintered bearing for a fuel pump, it is preferred that the content of aluminum be from 8 to 9% by mass. This suppresses sulfidation corrosion and organic acid corrosion caused by gasoline of inferior quality, and the sintered bearing thus obtained is excellent in performance such as initial conformability and durability.

It is preferred that, in the manufacturing method for a sintered bearing, a forming in the sizing step comprises a die, a pair of punches, and a core, and the sizing step comprises compressing the sintered compact from both sides in an axial direction and a radially outer side with the punches and the die to shape a radially inner side of the sintered compact with the core. Thus, the sintered bearing can be subjected to dimension shaping and desired pores can be formed through effective use of the expansion of an aluminum copper-based sintered bearing by sintering.

It is preferred that the size of each pore on the surface of the sintered compact can be set by adjusting a dimension difference between an inner diameter dimension of the die and an outer diameter dimension of the sintered compact and a dimension difference between an outer diameter dimension of the core and an inner diameter dimension of the sintered compact. Thus, the size of each pore on the surface of the sintered bearing can be controlled easily.

Further, through the use of a mesh-belt type continuous furnace during the sintering step, productivity can be enhanced further and cost can be reduced further. From the viewpoint of a function of a sintered bearing, strength can be ensured sufficiently.

Specifically, the load on the mesh-belt type continuous furnace can be alleviated, and stable quality and manufacturing method can be realized by setting the sintering temperature during the sintering step to from 850 to 950° C., using a reducing atmosphere as the sintering atmosphere, and setting the sintering time to from 10 to 60 minutes.

Effects of the Invention

In the sintered bearing according to one embodiment of the present invention, corrosion resistance, mechanical characteristics such as strength and abrasion resistance, oil film formation property, and oil holding property can be enhanced, and compactness and reduction in cost can be realized. Further, the manufacturing method for a sintered bearing according to one embodiment of the present invention can realize a manufacturing method for an aluminum bronze-based sintered bearing, which has good productivity and low cost, and thus is suitable for mass production.

EMBODIMENTS OF THE INVENTION

Figure 1:
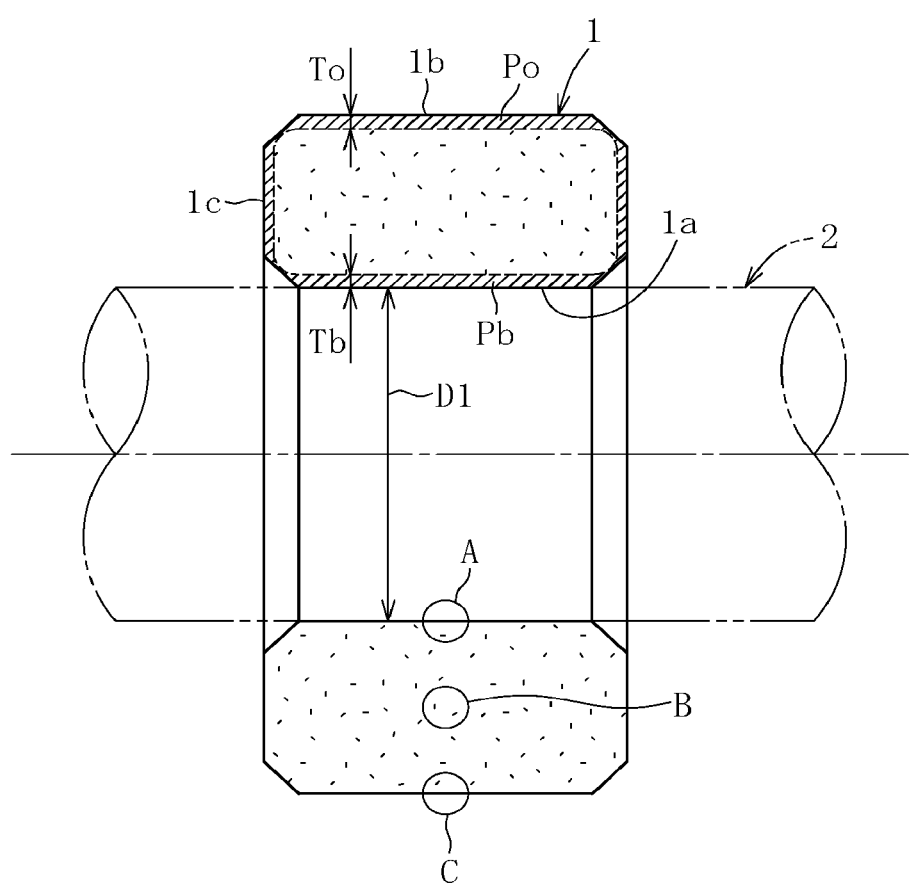
FIG. 1 is a vertical sectional view of a sintered bearing according to each of first to third embodiments of the present invention and a sintered bearing based on a manufacturing method according to each of first to third embodiments of the present invention.

Now, a sintered bearing according to a first embodiment of the present invention and a manufacturing method according to a first embodiment of the present invention are described with reference to the attached drawings. FIGS. 1 and 2 illustrate the sintered bearing according to the first embodiment, and FIGS. 3 to 8 illustrate the manufacturing method according to the first embodiment.

As illustrated in FIG. 1, a sintered bearing 1 as the sintered bearing according to the first embodiment is formed in a cylindrical shape having a bearing surface 1a on an inner circumference. When a shaft 2 is inserted with respect to the inner circumference of the sintered bearing 1, and the shaft 2 is rotated in this state, lubricating oil held in an indefinite number of pores of the sintered bearing 1 seeps out from the bearing surface 1a along with an increase in temperature. The lubricating oil that has seeped out forms an oil film between a bearing gap between the outer circumferential surface of the shaft 2 and the bearing surface 1a, and the shaft 2 is supported by the bearing 1 so as to be rotatable relatively.

The sintered bearing 1 according to the first embodiment is formed by filling a form with raw material powder obtained by mixing various powders, compressing the raw material powder to form a green compact, and then sintering the green compact.

The raw material powder is mixed powder comprising copper powder, powder having a composition of copper, aluminum, and an aluminum-copper alloy, silicon powder, tin powder, phosphorus alloy powder, and graphite powder as main components. The detail of each powder is described below.

[Copper Powder]

As the copper powder, spherical or dendritic copper powder used generally for a sintered bearing can be used, and for example, reduced powder, electrolytic powder, water atomized powder, or the like is used. The grain size of the copper powder is set so that the copper powder is powder having passed through a 100 mesh and a ratio of powder having passed through a 350 mesh is 40% or less.

[Powder Having Composition of Copper, Aluminum, and Aluminum-Copper Alloy]

The powder having a composition of copper, aluminum, and an aluminum-copper alloy (hereinafter referred to as "aluminum-copper alloy powder) is obtained by heating mixed powder comprising 40 to 60% by mass of aluminum alloy powder and the balance being copper powder in a reducing or inert atmosphere, pulverizing the resultant, and adjusting the grain size thereof. The preferred grain size of the aluminum-copper alloy powder is set so that the aluminum-copper alloy powder is powder having passed through a 80 mesh and a ratio of powder having passed through a 350 mesh is 60% or less. The problem of shortage of strength of a green compact caused by a decrease in forming ability due to the hardness of powder is solved by using the aluminum-copper alloy powder, and in this case, there arises no problem of handling due to scattering of aluminum simple substance particles having a small specific gravity.

It is preferred that the composition of the aluminum-copper alloy powder fall within a range of from 40 to 60% by mass of aluminum. When the powder comprises aluminum in an amount of less than 40% by mass, the density of a green compact during pressure forming is decreased owing to a decrease in a copper powder mixing ratio, and the generation amount of a copper silicon-based liquid phase under low-temperature sintering is reduced owing to the generation of an alloy phase having a high melting point, with the result that the effect exhibited by adding a sintering accelerating element is decreased. On the other hand, when the powder comprises aluminum in an amount of more than 60% by mass, unreacted aluminum particles are scattered owing to increases in aluminum particles that remain unreacted with copper particles, and there arises a problem of handling in terms of the scattering.

In the sintered bearing according to the first embodiment and the manufacturing method for the sintered bearing described later, copper powder, aluminum-copper alloy powder, and phosphorus alloy powder, silicon powder, and tin powder described later are mixed at such a ratio that the content of aluminum is from 3 to 10% by mass, the content of silicon is from 1 to 4% by mass, the content of tin is from 0.5 to 2% by mass, the content of phosphorus is from 0.05 to 0.5% by mass, and the balance comprises copper as a main component, and graphite powder is mixed with a total of 100% by mass of the above-mentioned mixture so that the blending amount of graphite is from 1 to 5% by mass to obtain raw material powder.

[Phosphorus Alloy Powder]

Phosphorus enhances wettability between a solid phase and a liquid phase during sintering and suppresses the generation of a nitride film that shifts a temperature for generation of a liquid phase caused by the addition of silicon powder to a low temperature side. It is preferred that the blending amount of phosphorus be from 0.05 to 0.5% by mass. When the blending amount of phosphorus is less than 0.05% by mass, the accelerating effect on the sintering between a solid phase and a liquid phase is unsatisfactory. On the other hand, when the blending amount of phosphorus is more than 0.5% by mass, the sintering proceeds excessively, and aluminum is segregated to increase a Y-phase, with the result that a sintered compact becomes brittle.

[Silicon Powder]

Silicon is added as the sintering aid. Silicon generates a copper silicon-based liquid phase with respect to a phase of inhibiting the progress of sintering formed during the sintering step and accelerates the sintering. It is preferred that the blending amount of silicon be from 1 to 4% by mass. When the blending amount of silicon is less than 1% by mass, the amount of a liquid phase to be generated is small, and the accelerating effect on liquid-phase sintering at low temperature becomes insufficient, with the result that a sintered compact that is dense and has appropriate hardness cannot be obtained. On the other hand, when the blending amount of silicon is more than 4% by mass, the sintering proceeds excessively, and aluminum is segregated to increase a Y-phase, with the result that a sintered compact becomes brittle.

[Tin Powder]

Tin is added as the sintering aid. Tin has effects of compensating for a decrease in forming ability due to the addition of silicon powder and decreasing a temperature for generation of a liquid phase generated by the addition of silicon powder in the same way as in phosphorus. It is preferred that the blending amount of tin be from 0.5 to 2% by mass. When the blending amount of tin be less than 0.5% by mass, the effect of increasing a green compact density by the addition of tin powder is not obtained. On the other hand, it is not preferred that the blending amount of tin be more than 2% by mass, because a high concentration of tin is precipitated in a grain boundary, which degrades the quality of outer appearance of a sintered compact.

[Graphite Powder]

Graphite is present mainly as free graphite in pores dispersed and distributed in a substrate and contributes to the enhancement of abrasion resistance by imparting excellent lubricity to a sintered bearing. It is preferred that the blending amount of graphite be from 1 to 5% by mass with respect to a total of 100% by mass of aluminum, silicon, tin, phosphorus, copper, and inevitable impurities. When the blending amount of graphite is less than 1% by mass, the effects of enhancing lubricity and abrasion resistance by the addition of graphite cannot be obtained. On the other hand, it is not preferred that the blending amount of graphite be more than 5% by mass, because the strength is decreased.

Figure 2A:
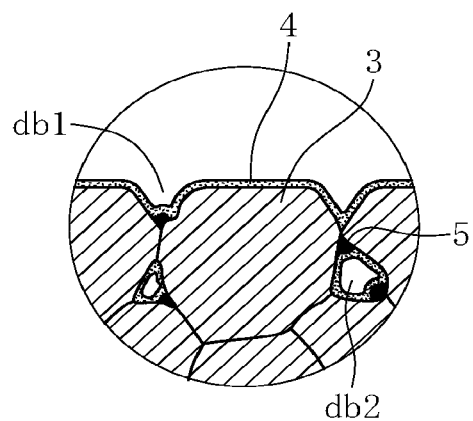
FIG. 2a is a schematic view of an enlarged metal structure in an A portion of FIG. 1.
Figure 2B:
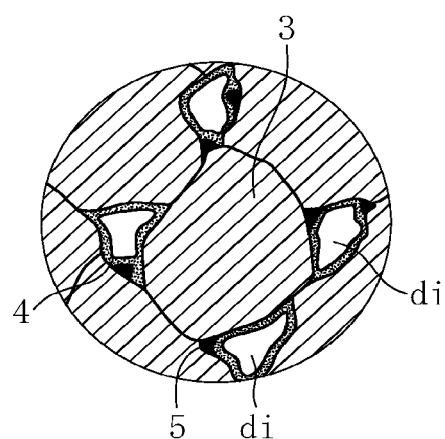
FIG. 2b is a schematic view of an enlarged metal structure in a B portion of FIG. 1.
Figure 2C:
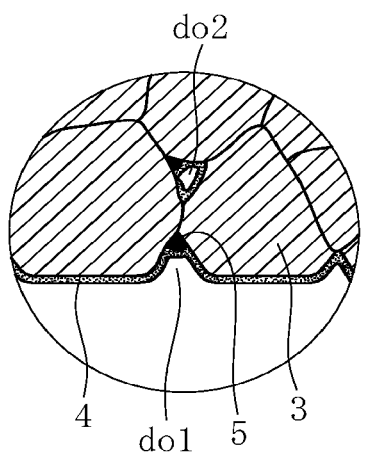
FIG. 2c is a schematic view of an enlarged metal structure in a C portion of FIG. 1.

FIG. 2 are schematic views illustrating a metal structure in a cross-section of the sintered bearing according to the first embodiment. FIG. 2(a) is an enlarged view of an A portion of FIG. 1. Similarly, FIG. 2(b) is an enlarged view of a B portion of FIG. 1. FIG. 2(c) is an enlarged view of a C portion of FIG. 1. That is, FIG. 2(a) illustrates a metal structure of a surface layer portion of a bearing surface on a radially inner side. FIG. 2(b) illustrates a metal structure of an inside. FIG. 2(c) illustrates a metal structure of a surface layer portion of a radially outer surface. As illustrated in FIGS. 2(a), 2(b), and 2(c), an aluminum-copper alloy structure 3 is a hatched portion, and an aluminum oxide film 4 is present on a surface and around an inner pore. Therefore, the aluminum-copper alloy structure is excellent in corrosion resistance and abrasion resistance. Although not shown, in a grain boundary portion of the aluminum-copper alloy structure 3, tin and phosphorus are present in large amounts and silicon is present in a scattered manner. Free graphite 5 is distributed in the pore, and hence the aluminum-copper alloy structure is excellent in lubricity and abrasion resistance.

As illustrated in FIG. 2(a), an open pore db1 formed on the bearing surface on a radially inner side and an internal pore db2 in a surface layer of the bearing surface are formed. As illustrated in FIG. 2(b), pores di are formed in the bearing, and as illustrated in FIG. 2(c), an open pore do1 formed on a radially outer surface and an internal pore do2 formed in a surface layer of the radially outer surface are formed. The open pore db1 formed on the bearing surface, the internal pore db2 in the surface layer of the bearing surface, the pore di in the bearing, the open pore do1 formed on the radially outer surface, and the internal pore do2 formed in the surface layer of the radially outer surface communicate with each other.

In the sintered bearing 1, both the radially outer surface 1b of the bearing and the bearing surface 1a on the radially inner side are subjected to sizing processing after sintering in a manufacturing method (see FIG. 7) described later. In addition, an aluminum bronze-based sintered bearing expands by sintering, and hence the radially outer surface 1b of the bearing is sized in an amount larger than that of the bearing surface 1a on the radially inner side. Therefore, the pores do (see FIG. 2(c)) in the surface layer portion on the radially outer surface 1b side are more crushed than the pores db (see FIG. 2(a)) in the surface layer portion on the bearing surface 1a side. When the pore do in the surface layer portion on the radially outer surface 1b side, the pore db in the surface layer portion on the bearing surface 1a side, and the pore di (see FIG. 2(b)) in the bearing that is not crushed are compared to each other in terms of size, a relationship of do<db<di is satisfied. By virtue of this relationship, corrosion resistance and oil film formation property can be enhanced on the bearing surface 1a side. On the other hand, on the radially outer surface 1b side and on the end surface 1c side close to a closed state, corrosion resistance and oil holding property can be enhanced.

The pores do, db, and di of the sintered bearing 1 are impregnated with lubricating oil. Thus, a satisfactory lubrication state can be obtained from the beginning of an operation. As the lubricating oil, mineral oil, poly-α-olefin (PAO), an ester, liquid grease, or the like can be used. Note that, it is not necessarily required to impregnate those pores with the lubricating oil in some use purposes of a bearing.

FIG. 1 illustrates a compressed layer in a surface layer of the sintered bearing 1 with hatching. Hatching is provided only to an upper half in a radial direction of the bearing 1, and hatching is omitted in a lower half thereof. The surface layer of the sintered bearing 1 has a compressed layer. A density ratio αo of a compressed layer Po in the surface layer on the radially outer surface 1b side and a density ratio αb of a compressed layer Pb in the surface layer on the bearing surface 1a side are both higher than a density ratio α1 of the inside, and both of the density ratios αo and αb are set in a range of 80%≤αo and αb≤95%. It is not preferred that the density ratios αo and αb be less than 80%, because the bearing strength becomes insufficient. On the other hand, it is not preferred that the density ratios αo and αb be more than 95%, because the oil content becomes insufficient. Herein, αo and αb are collectively referred to as "α".

In addition, when an average value of depths of the compressed layer Po in the surface layer on the radially outer surface 1b side is defined as To, an average value of depths of the compressed layer Pb in the surface layer on the bearing surface 1a side is defined as Tb, and ratios of To and Tb to the inner diameter dimension D1 of the bearing surface are defined as To/D1 and Tb/D1, respectively, it is preferred that relationships of $1/100 \leq To/D1$ and $Tb/D1 \leq 1/15$ be satisfied. Herein, the density ratio α is represented by the following expression:

$$\alpha(\%) = (\rho 1/\rho 0) \times 100$$

where ρ1 represents a density of a porous body, and ρ0 represents a density in the case where it is assumed that the porous body has no micropores.

It is not preferred that To/D1 and Tb/D1 be less than 1/100 because pores are crushed insufficiently. On the other hand, it is not preferred that To/D1 and Tb/D1 be more than 1/15 because pores are crushed excessively. Note that, herein, To and Tb are collectively referred to as "T".

Figure 3:
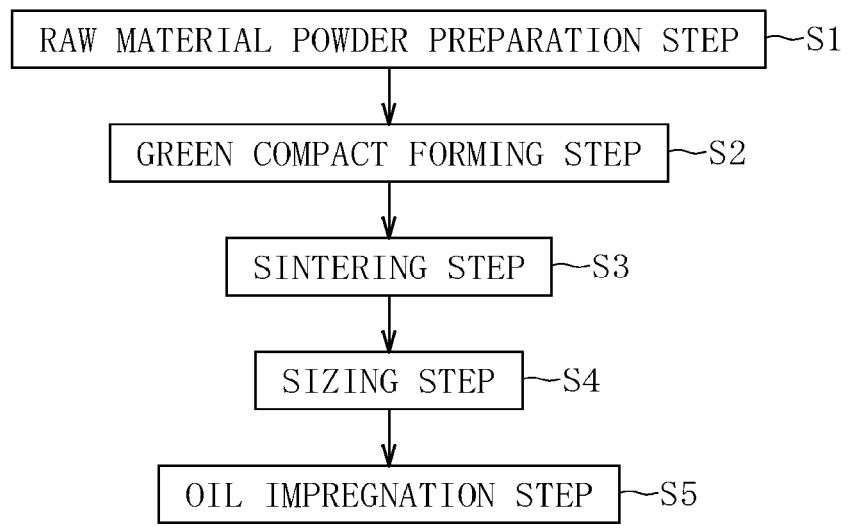
FIG. 3 is a diagram illustrating a manufacturing process for the sintered bearing.
Figure 4:
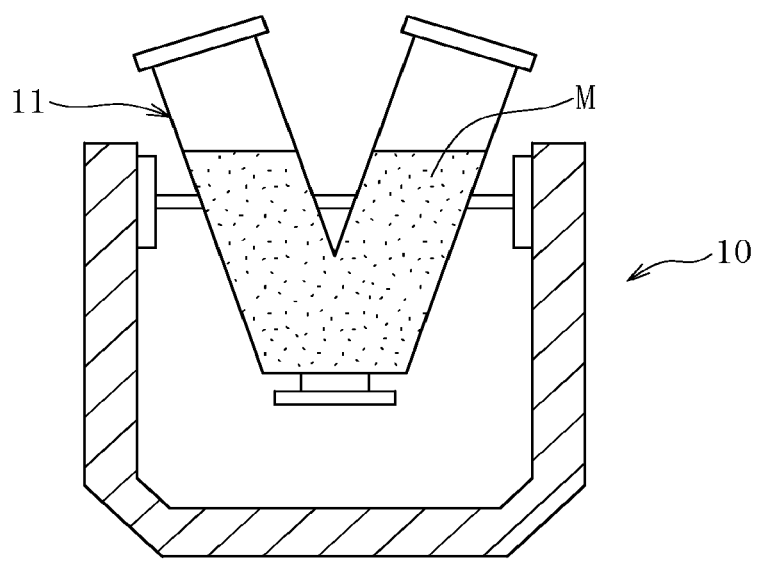
FIG. 4 is a schematic view of a mixer for raw material powder.
Figure 5:
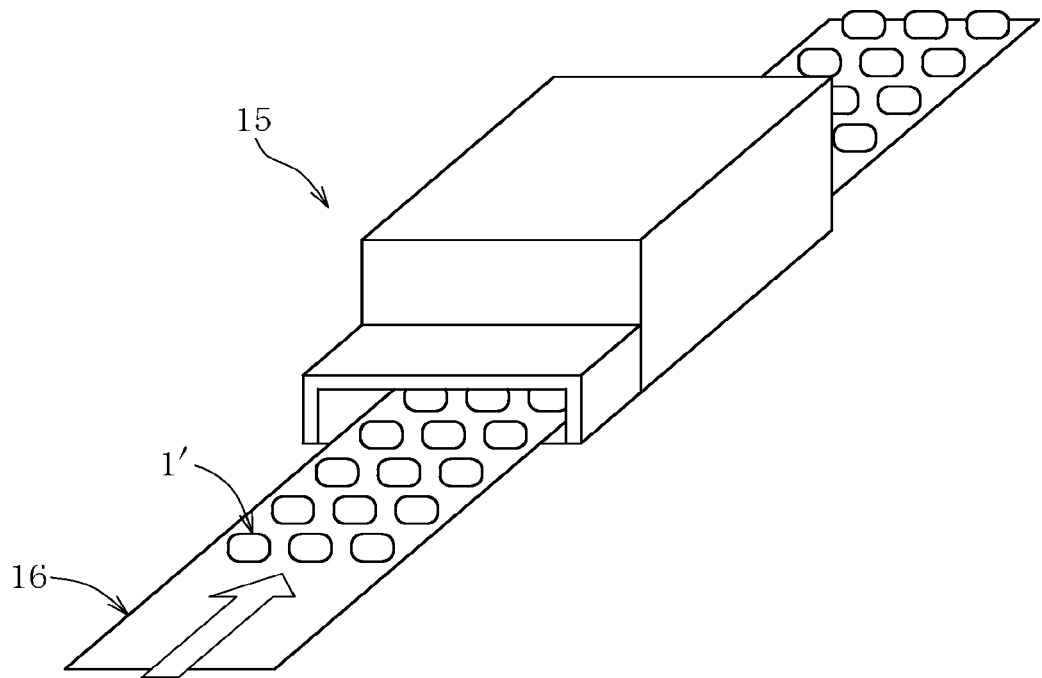
FIG. 5 is a schematic view of a mesh-belt type continuous furnace.

Next, the manufacturing method for a sintered bearing according to the first embodiment is described. A sintered bearing is manufactured through a raw material powder preparation step S1, a green compact forming step S2, a sintering step S3, a sizing step S4, and an oil impregnation step S5 as illustrated in FIG. 3.

[Raw Material Powder Preparation Step S1]

In the raw material powder preparation step S1, raw material powder of the sintered bearing 1 is prepared and generated. The raw material powder was prepared and generated by adding 3% by mass of graphite powder and 0.5% by mass of a lubricant such as zinc stearate or calcium stearate for enhancing forming ability to a total of 100% by mass of 81% by mass of copper powder, 12% by mass of 50% by mass aluminum-copper alloy powder, 3% by mass of silicon powder, 1% by mass of tin powder, and 3% by mass of 8% by mass phosphorus-copper alloy powder. By adding the lubricant, a green compact described later can be released smoothly, and the deformation of the green compact due to the release can be prevented. Specifically, raw material powder M as described above is supplied to a can body 11 of a V-shaped mixer 10 illustrated in FIG. 4, and is uniformly mixed by rotating the can body 11.

[Green Compact Forming Step S2]

Figure 7:
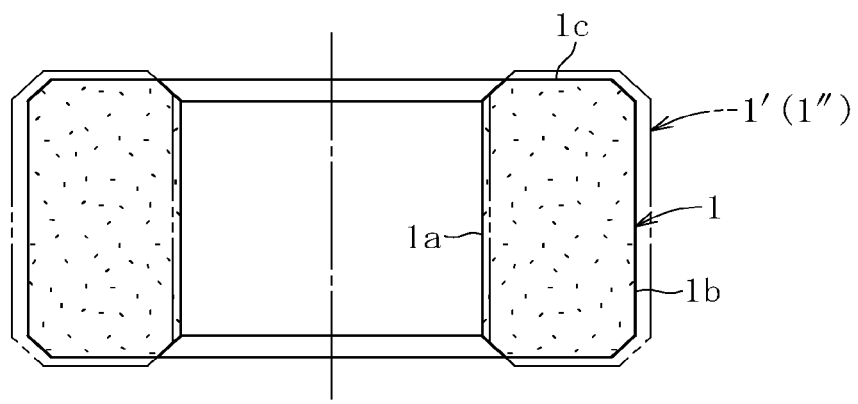
FIG. 7 is a view illustrating a compressed state of a product during the sizing step.

In the green compact forming step S2, the above-mentioned raw material powder is compressed to form a green compact 1' (see FIG. 7) having a shape of the sintered bearing 1. The green compact 1' is subjected to compression forming so that a sintered compact 1" to be formed by heating at a sintering temperature or more has a density ratio α of from 70% to 80%. In FIG. 7, for convenience, the green compact and the sintered compact are illustrated with reference numerals 1' and 1", respectively.

Specifically, for example, a form having a cavity with a shape similar to that of a green compact is set on a CNC press machine using a servo motor as a drive source. The raw material powder filling the cavity is compressed with a pressurization force of from 200 to 700 MPa to form the green compact 1'. During forming of the green compact 1', the form may be heated to 70° C. or more.

In the manufacturing method for the sintered bearing 1 according to the first embodiment, the problem of shortage of strength of a green compact caused by a decrease in forming ability due to fluidity is solved by using aluminum-copper alloy powder as an aluminum source, and in this case, there arises no problem of handling due to scattering of aluminum simple substance particles having a small specific gravity. Further, the manufacturing method has good production efficiency and hence is suitable for mass production.

[Sintering Step S3]

In the sintering step S3, the green compact 1' is heated at a sintering temperature and the raw material powders adjacent to each other are bound by sintering to form the sintered compact 1". The green compact 1' is supplied in a large amount to a mesh belt 16 of a mesh-belt type continuous furnace 15 illustrated in FIG. 5, and the green compact 1' is heated at from 850 to 950° C. (for example, 900° C.) for 10 to 60 minutes in a reducing atmosphere such as a mixed gas atmosphere of nitrogen gas and hydrogen gas or a nitrogen gas atmosphere so as to prevent oxidation as much as possible, whereby the sintered compact 1″ is formed. Thus, a load on the mesh-belt type continuous furnace is alleviated, and stable quality and manufacturing method can be realized.

The aluminum-copper alloy powder generates various liquid phases when the temperature is equal to or higher than 548° C. as the eutectic temperature. When the liquid phases are generated, the aluminum-copper alloy powder expands, and a sintering neck is formed owing to the generated liquid phases, which leads to densification, resulting in reduction in dimension. In the first embodiment, as a result of the sintering in the mesh-belt type continuous furnace 15, the surface of the sintered compact 1″ is oxidized, and the sintering thereof is inhibited. Therefore, the sintered compact 1″ is not densified, and the dimension thereof remains expanding. Note that, the inside of the sintered compact 1″ is sintered without being oxidized, and hence the strength of the sintered compact 1″ can be ensured sufficiently. Owing to the use of the mesh-belt type continuous furnace 15, the sintering time from the supply of the green compact 1′ to the release thereof can be shortened to mass-produce products, and cost can also be reduced. Further, from the viewpoint of the function of the sintered bearing, the strength can be ensured sufficiently.

In the sintering step, the added phosphorus alloy powder, tin powder, silicon powder, and graphite powder exhibit the synergistic effect described below. Thus, a sintered compact of good quality can be formed. First, phosphorus has effects of enhancing wettability between a solid phase and a liquid phase during sintering and shifting a temperature for generation of a liquid phase caused by the addition of silicon powder to a low temperature side, and hence a sintered compact of good quality can be obtained. It is preferred that the blending amount of phosphorus be from 0.05 to 0.5% by mass. When the blending amount of phosphorus is less than 0.05% by mass, the effect of accelerating the sintering between a solid phase and a liquid phase is unsatisfactory. On the other hand, when the blending amount of phosphorus is more than 0.5% by mass, a sintered compact to be obtained becomes brittle. Further, silicon serving as the sintering aid generates a copper silicon-based liquid phase with respect to a phase of inhibiting the progress of sintering formed during the sintering step and accelerates the sintering. It is preferred that the blending amount of silicon be from 1 to 4% by mass. When the blending amount of silicon is less than 1% by mass, the amount of a liquid phase to be generated is small and the effect of accelerating the sintering of a liquid phase at low temperature becomes insufficient, with the result that a sintered compact that is dense and has appropriate hardness cannot be obtained. On the other hand, when the blending amount of silicon is more than 4% by mass, a sintered compact to be obtained is hard and brittle.

In addition, tin serving as the sintering aid exhibits the effects of compensating for a decrease in forming ability due to the addition of silicon powder, and decreasing the temperature for generation of a liquid phase to be generated by the addition of silicon powder in the same way as in phosphorus. It is preferred that the blending amount of tin be from 0.5 to 2% by mass. It is not preferred that the blending amount of tin be less than 0.5% by mass, because the effect of raising a green compact density by the addition of tin powder cannot be obtained. On the other hand, it is not preferred that the blending amount of tin be more than 2% by mass, because a high concentration of tin is precipitated in a grain boundary and inhibits the diffusion of aluminum.

The sintering aid is added to the raw material powder M as described above, and hence the sintered compact 1″ having a structure in which an aluminum-copper alloy is sintered can be obtained, and strength and corrosion resistance can be enhanced.

Further, graphite is present mainly as free graphite in pores dispersed and distributed in a substrate and contributes to the enhancement of abrasion resistance by imparting excellent lubricity to a sintered bearing. It is preferred that the blending amount of graphite be from 1 to 5% by mass with respect to a total of 100% by mass of aluminum, silicon, tin, phosphorus, copper, and inevitable impurities. When the blending amount of graphite is less than 1% by mass, the effects of enhancing lubricity and abrasion resistance by adding graphite powder cannot be obtained. On the other hand, it is not preferred that the blending amount of graphite be more than 5% by mass, because strength is decreased.

[Sizing Step S4]

Figure 6A:
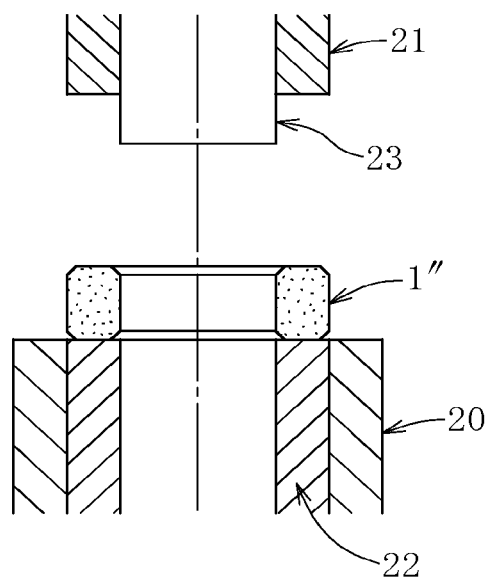
FIG. 6a is a view illustrating a sizing step.
Figure 6B:
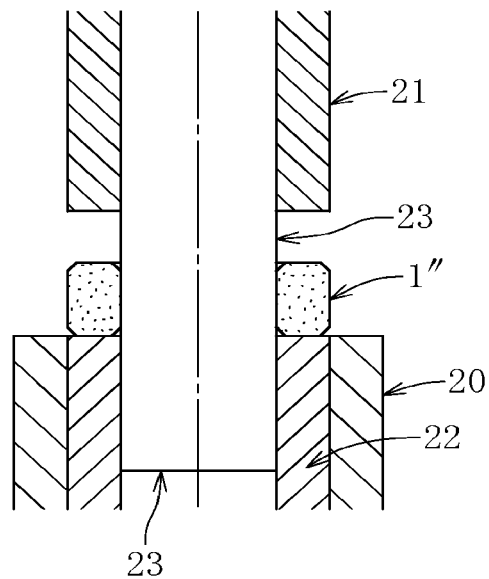
FIG. 6b is a view illustrating the sizing step.
Figure 6C:
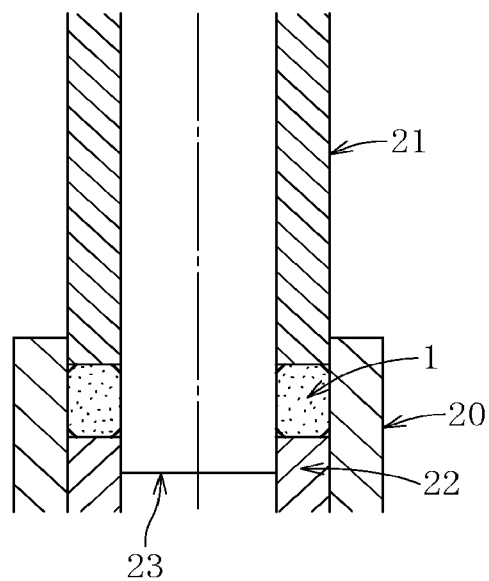
FIG. 6c is a view illustrating the sizing step.

In the sizing step S4, the sintered compact 1″ that has expanded compared to the green compact 1′ by sintering is subjected to dimension shaping. FIG. 6 illustrate the details of the sizing step S4. A form for sizing processing includes a die 20, an upper punch 21, a lower punch 22, and a core 23. As illustrated in FIG. 6(*a*), the sintered compact 1″ is set on the lower punch 22 while the core 23 and the upper punch 21 are retracted upward. As illustrated in FIG. 6(*b*), first, the core 23 enters a radially inner portion of the sintered compact 1″. Then, as illustrated in FIG. 6(*c*), the sintered compact 1″ is pushed into the die 20 by the upper punch 21. After that, the sintered compact 1″ is compressed with the upper and lower punches 21, 22. As a result, the surface of the sintered compact 1″ is subjected to dimension shaping. Pores in the surface layer of the expanding sintered compact 1″ are crushed by sizing processing to cause a density difference between the inside of the product and the surface layer portion.

FIG. 7 illustrates a state in which the sintered compact 1″ is compressed by sizing processing. The sintered compact 1″ before sizing processing is indicated by a two-dot chain line, and a product 1 after sizing processing is indicated by a solid line. As indicated by the two-dot chain line, the sintered compact 1″ has expanded in a radial direction and a width direction. Therefore, the radially outer surface 1*b* of the sintered compact 1″ is compressed more than the bearing surface 1*a* on the radially inner side. As a result, the pore do (see FIG. 2(*c*)) in the surface layer on the radially outer surface 1*b* side is crushed more than the pore db (see FIG. 2(*a*)) in the surface layer of the bearing surface 1*b* on the radially inner side, and a relationship of do<db<di is satisfied with respect to the pore di (see FIG. 2(*b*)) in the bearing that is not crushed. By virtue of such relationship, in the bearing surface 1*a* on the radially inner side, corrosion resistance and oil film formation property can be enhanced. On the other hand, in the radially outer surface 1*b* and the end surface 1*c* close to a closed state, corrosion resistance and oil holding property can be enhanced.

The form used during the sizing step includes the die 20, a pair of the punches 21, 22, and the core 23, and the radially inner side of the sintered compact 1″ is shaped by the core 23 by compressing the sintered compact 1″ from both sides in the axial direction and the radially outer side with the punches 21, 22 and the die 20. Thus, the sintered bearing 1 can be subjected to dimension shaping and desired pores can be formed through effective use of the expansion of an aluminum bronze-based sintered bearing by sintering.

Further, the size of each pore on the surface of the sintered compact 1″ can be set by adjusting a dimension difference between the inner diameter dimension of the die 20 and the outer diameter dimension of the sintered compact 1″ and a dimension difference between the outer diameter dimension of the core 23 and the inner diameter dimension of the sintered compact 1″. Thus, the size of each pore on the surface of the sintered bearing 1 can be controlled easily.

[Oil Impregnation Step S5]

Figure 8:
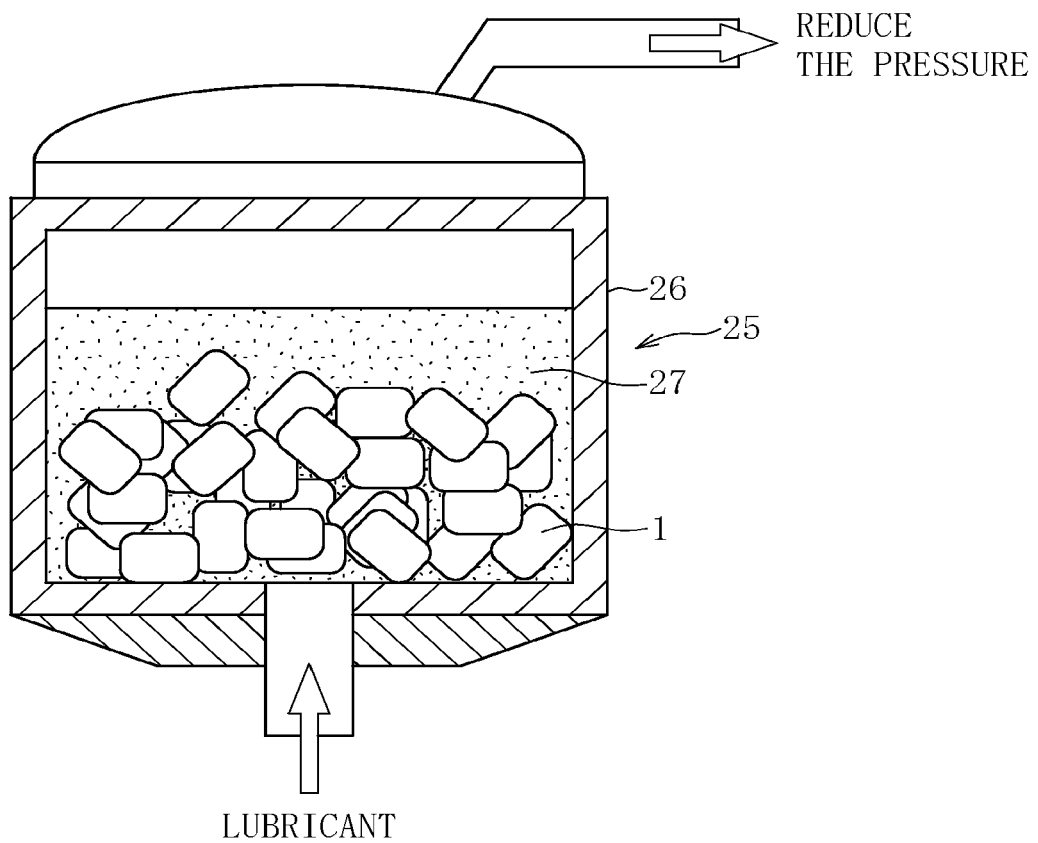
FIG. 8 is a schematic view of an oil impregnation device.

The oil impregnation step S5 is the step of impregnating the product 1 (sintered bearing) with lubricating oil. FIG. 8 illustrates an oil impregnation device. The product 1 is put in a tank 26 of the oil impregnation device 25, and then lubricating oil 27 is poured into the tank 26. The inside of the tank 26 is reduced in pressure to impregnate the pores do, db, and di (see FIG. 2) of the product 1 with the lubricating oil 27. Thus, a satisfactory lubrication state can be obtained from the beginning of an operation. As the lubricating oil, mineral oil, poly-α-olefin (PAO), an ester, liquid grease, or the like can be used. Note that, it is appropriate that the pores do, db, and di be impregnated with lubricating oil depending on the use purpose of a bearing, and this impregnation is not necessarily required.

The sintered bearing 1 according to the first embodiment manufactured through the above-mentioned steps has enhanced corrosion resistance, mechanical characteristics such as strength and abrasion resistance, oil film formation property, and oil holding property, and can also achieve compactness and reduction in cost.

Next, a sintered bearing according to a second embodiment of the present invention and a manufacturing method according to a second embodiment of the present invention are described. The second embodiment is different from the first embodiment in that silicon and tin are used as the sintering aid in the first embodiment, whereas aluminum fluoride and calcium fluoride are used as the sintering aid in the sintered bearing and manufacturing method in the second embodiment.

Raw material powder in the sintered bearing and manufacturing method according to the second embodiment is mixed powder containing copper powder, aluminum-copper alloy powder, phosphorus alloy powder, and graphite powder used in the first embodiment, and a sintering aid containing aluminum fluoride and calcium fluoride as main components. Copper powder, aluminum-copper alloy powder, phosphorus alloy powder, and graphite powder are the same as those of the first embodiment, and hence repeated descriptions thereof are omitted.

In the second embodiment, copper powder, aluminum-copper alloy powder, and phosphorus alloy powder are mixed at such a ratio that the content of aluminum is from 7 to 12% by mass, the content of phosphorus is from 0.05 to 0.5% by mass, and the balance comprises copper as a main component, and a total of 0.05 to 0.2% by mass of aluminum fluoride and calcium fluoride serving as the sintering aid and 1 to 5% by mass of graphite are mixed with a total of 100% by mass of the above-mentioned mixture to obtain raw material powder.

[Aluminum Fluoride and Calcium Fluoride]

An aluminum oxide film to be generated on a surface of aluminum-containing copper-based alloy powder during sintering inhibits the sintering remarkably. However, aluminum fluoride and calcium fluoride serving as the sintering aid evaporate gradually while being melted at a sintering temperature of from 850 to 900° C. of the aluminum-containing copper-based alloy powder and protect the surface of the aluminum-containing copper-based alloy powder to suppress the generation of aluminum oxide, thereby accelerating the sintering to increase the diffusion of aluminum. Aluminum fluoride and calcium fluoride evaporate and volatilize during sintering, and hence hardly remain in a finished product of the sintered bearing.

It is preferred that aluminum fluoride and calcium fluoride serving as the sintering aid be added in an amount of from about 0.05 to 0.2% by mass in total with respect to a total of 100% by mass of raw material powder comprising aluminum, phosphorus, and the balance comprising copper as a main component, and inevitable impurities. When the addition amount of aluminum fluoride and calcium fluoride is less than 0.05% by mass, the effect as the sintering aid is insufficient, and a sintered compact that is dense and has appropriate hardness is not obtained. On the other hand, when the addition amount of aluminum fluoride and calcium fluoride is more than 0.2% by mass, the effect as the sintering aid is not enhanced even when they are added any more, and hence it is preferred that the addition amount be limited to 0.2% by mass or less from the viewpoint of cost.

The metal structure of a cross-section of the sintered bearing according to the second embodiment is the same as that of the first embodiment illustrated in the schematic view of FIG. 2. Therefore, only main portions are described, and the repeated descriptions of the remaining portions are omitted. As illustrated in FIGS. 2(*a*), 2(*b*), and 2(*c*), in the sintered bearing 1 according to the second embodiment, an aluminum-copper alloy structure 3 is a hatched portion, and an aluminum oxide film 4 is present on a surface and around an internal pore. Therefore, the aluminum-copper alloy structure is excellent in corrosion resistance and abrasion resistance. Although not shown, in a grain boundary portion of the aluminum-copper alloy structure 3, phosphorus is present. Free graphite 5 is distributed in the pore, and hence the aluminum-copper alloy structure is excellent in lubricity and abrasion resistance.

In addition, in the sintered bearing 1 according to the second embodiment as well, as illustrated in FIG. 7, both the radially outer surface 1*b* of the bearing and the bearing surface 1*a* on the radially inner side are subjected to sizing processing after sintering. An aluminum bronze-based sintered bearing expands by sintering, and hence the radially outer surface 1*b* of the bearing is sized in an amount larger than that of the bearing surface 1*a* on the radially inner side. Therefore, the pores do (see FIG. 2(*c*)) in the surface layer portion on the radially outer surface 1*b* side are more crushed than the pores db (see FIG. 2(*a*)) in the surface layer portion on the bearing surface 1*a* side. When the pore do in the surface layer portion on the radially outer surface 1*b* side, the pore db in the surface layer portion on the bearing surface 1*a* side, and the pore di (see FIG. 2(*b*)) in the bearing which is not crushed are compared to each other in terms of size, a relationship of do<db<di is satisfied. By virtue of this relationship, corrosion resistance and oil film formation property can be enhanced on the bearing surface 1*a* side. On the other hand, on the radially outer surface 1*b* side and on the end surface 1*c* side close to a closed state, corrosion resistance and oil holding property can be enhanced. The pores do, db, and di of the sintered bearing 1 are impregnated with lubricating oil. Thus, a satisfactory lubrication state can be obtained from the beginning of an operation. As the lubricating oil, mineral oil, poly-α-olefin (PAO), an ester, liquid grease, or the like can be used. Note that, it is not necessarily required to impregnate those pores with lubricant depending on the use purpose of a bearing.

Further, the state of the compressed layer in the surface layer of the sintered bearing 1 according to the second embodiment is also the same as that of the sintered bearing according to the first embodiment illustrated in FIG. 1. That is, as illustrated in FIG. 1, in the sintered bearing 1 according to the second embodiment, the surface layer of the sintered bearing 1 includes a hatched compressed layer. According to the above-mentioned expression of the density ratio α, a density ratio αo of a compressed layer Po in the surface layer on the radially outer surface 1b side and a density ratio αb of a compressed layer Pb in the surface layer on the bearing surface 1a side are both higher than a density ratio αi of the inside, and both of the density ratios αo and αb are set in a range of 80%≤αo and αb≤95%.

In addition, when an average value of depths of the compressed layer Po in the surface layer on the radially outer surface 1b side is defined as To, an average value of depths of the compressed layer Pb in the surface layer on the bearing surface 1a side is defined as Tb, and ratios of To and Tb to the inner diameter dimension D1 of the bearing surface are defined as To/D1 and Tb/D1, respectively, To/D1 and Tb/D1 are set to $\frac{1}{100}$≤To/D1 and Tb/D1≤$\frac{1}{15}$.

The manufacturing method according to the second embodiment is also the same as the manufacturing method for a sintered bearing according to the first embodiment illustrated in FIG. 3. Therefore, only differences of specific contents in the raw material powder preparation step S1 and the sintering step S3 are described.

[Raw Material Powder Preparation Step S1]

Raw material powder was prepared by adding a total of from 0.05 to 0.2% by mass of aluminum fluoride and calcium fluoride serving as the sintering aid, 1 to 5% by mass of graphite powder, and 0.5% by mass of a lubricant such as zinc stearate or calcium stearate for enhancing forming ability to a total of 100% by mass of a remaining % by mass of copper powder, 14 to 20% by mass of 40 to 60% by mass aluminum-copper alloy powder, and 2 to 4% by mass of 8% by mass of phosphorus-copper alloy powder.

[Sintering Step S3]

In the sintering step, the added phosphorus alloy powder, aluminum fluoride, and calcium fluoride exhibit the effect described below. Thus, a sintered compact of good quality can be formed. First, phosphorus has an effect of enhancing wettability between a solid phase and a liquid phase during sintering, and hence a sintered compact of good quality can be obtained. It is preferred that the blending amount of phosphorus be from 0.05 to 0.5% by mass. When the blending amount of phosphorus is less than 0.05% by mass, the effect of accelerating the sintering between a solid phase and a liquid phase is unsatisfactory. On the other hand, when the blending amount of phosphorus is more than 0.5% by mass, a sintered compact to be obtained becomes brittle. Further, aluminum fluoride and calcium fluoride serving as the sintering aid evaporate gradually while being melted at a sintering temperature of from 850 to 900° C. of the aluminum-containing copper-based alloy powder and protect the surface of the aluminum-containing copper-based alloy powder to suppress the generation of aluminum oxide, thereby enabling the sintering. Aluminum fluoride and calcium fluoride evaporate and volatilize during sintering, and hence hardly remain in a finished product of the sintered bearing. Note that, a green compact is sintered in a case or the like because evaporation and volatilization occur. It is preferred that aluminum fluoride and calcium fluoride serving as the sintering aid be added in an amount of from about 0.05 to 0.2% by mass in total with respect to a total of 100% by mass of raw material powder comprising aluminum, phosphorus, and the balance comprising copper as a main component, and inevitable impurities.

Also in the manufacturing method for a sintered bearing according to the second embodiment, in the same way as in the first embodiment, as illustrated in FIG. 6, the radially inner side of the sintered compact 1" is shaped by the core 23 by compressing the sintered compact 1" from both sides in the axial direction and the radially outer side with the punches 21, 22 and the die 20 during a sizing step. Thus, the sintered bearing 1 can be subjected to dimension shaping and desired pores can be formed through effective use of the expansion of an aluminum bronze-based sintered bearing by sintering. Further, the size of each pore on the surface of the sintered compact 1" can be set by adjusting a dimension difference between the inner diameter dimension of the die 20 and the outer diameter dimension of the sintered compact 1" and a dimension difference between the outer diameter dimension of the core 23 and the inner diameter dimension of the sintered compact 1". Thus, the size of each pore on the surface of the sintered bearing 1 can be controlled easily.

Also in a sintered bearing based on the manufacturing method according to the second embodiment, corrosion resistance, mechanical characteristics such as strength and abrasion resistance, oil film formation property, and oil holding property can be enhanced, and compactness and reduction in cost can be realized.

A sintered bearing according to a third embodiment of the present invention and a manufacturing method according to a third embodiment of the present invention are described. The sintered bearing according to the third embodiment is specialized for a fuel pump of an automobile engine. The sintered bearing suppresses sulfidation corrosion and organic acid corrosion caused by gasoline of inferior quality and is excellent in performance such as initial conformability and durability.

Figure 9:
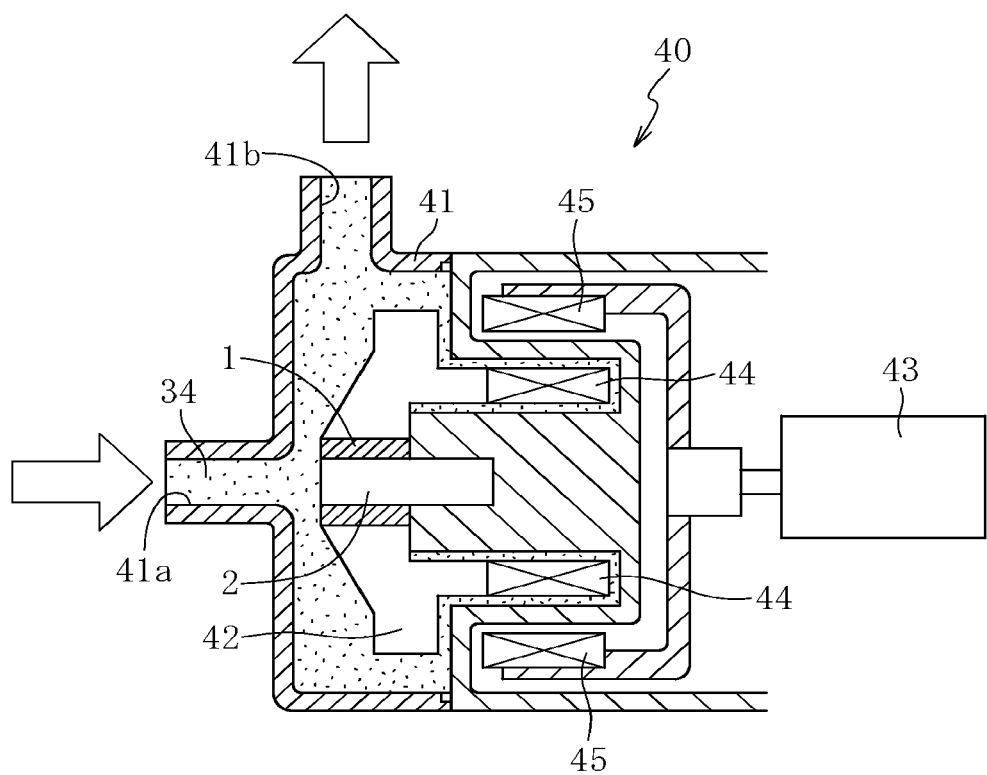
FIG. 9 is a vertical sectional view of a fuel pump.

FIG. 9 illustrates an example of a fuel pump for an automobile engine mounted with the sintered bearing according to the third embodiment incorporated therein. In a fuel pump 40, the sintered bearing 1 is provided on the rotation side. Specifically, the fuel pump 40 includes a casing 41 having a liquid inlet 41a and a liquid outlet 41b, a fixed shaft 2 fixed to the casing 41 and protruding to an internal space of the casing 41, an impeller 42 provided rotatably with respect to the fixed shaft 2, a motor 43, a magnet 44 mounted on the impeller 42, and a magnet 45 mounted on a rotation shaft of the motor 43 and opposing in a radial direction to the magnet 44 on the impeller 42 side. The sintered bearing 1 is fixed to an inner circumferential surface of the impeller 42, and an inner circumferential surface (bearing surface 1a, see FIG. 1) of the sintered bearing 1 and an outer circumferential surface of the fixed shaft 2 are fitted to each other slidably in a rotation direction. When the motor 43 is driven to rotate, the impeller 42 rotates owing to attraction force between the magnet 45 on the motor 43 side and the magnet 44 on the impeller 42 side. Thus, fuel having flowed into the internal space of the casing 41 from the liquid inlet 41a is sent out from the liquid output 42a.

In order to ensure performance such as initial conformability and durability while suppressing sulfidation corrosion and organic acid corrosion caused by gasoline of inferior quality in an environment constantly held in contact with the gasoline 34 as described above, various studies and test evaluation were conducted, and the third embodiment was achieved based on the following findings.

(1) In a relationship between the blending amount of aluminum and corrosion resistance, when the amount of aluminum increases, the diffusion of aluminum into copper increases, and thus the effect of corrosion resistance is large.

(2) In a relationship between the sintering temperature and the corrosion resistance, when the sintering temperature is increased, the diffusion of aluminum increases, and thus the effect of corrosion resistance is large.

(3) In a relationship between the density of a sintered bearing and the corrosion resistance, when the density increases, the effect of corrosion resistance is slightly enhanced.

(4) The additives (phosphorus, zinc, and silicon) can accelerate the diffusion of aluminum during the sintering step to reduce the amount of aluminum, thereby reducing the precipitation of a Y-phase of an aluminum structure that degrades corrosion resistance and initial conformability.

In order to suppress sulfidation corrosion and organic acid corrosion and enhance performance such as initial conformability and durability in a sintered bearing for a fuel pump, in the sintered bearing and manufacturing method according to the third embodiment, copper powder, aluminum-copper alloy powder, phosphorus alloy powder, silicon powder, and zinc alloy powder are mixed at such a ratio that the content of aluminum is from 8 to 9% by mass, the content of phosphorus is from 0.05 to 0.5% by mass, the content of silicon is from 0.5 to 3% by mass, the content of zinc is from 2 to 4% by mass, and the balance comprises copper as a main component, and a total of 0.05 to 0.2% by mass of aluminum fluoride and calcium fluoride, and 1 to 5% by mass of graphite are mixed with a total of 100% by mass of the above-mentioned mixture to obtain raw material powder. Regarding the raw material powder, although some parts are similar to those of the first and second embodiments, the details of each powder are described below.

[Copper Powder]

As the copper powder, there are given atomized powder, electrolytic powder, and pulverized powder. However, in order to sufficiently diffuse aluminum into copper, dendritic electrolytic powder is effective and is excellent in forming ability, sintering property, and sliding characteristics. Therefore, in the third embodiment, electrolytic powder was used as copper powder. The grain size thereof is set so that the electrolytic powder is powder having passed through a 100 mesh and a ratio of powder having passed through a 350 mesh is 40% or less.

[Aluminum-Copper Alloy Powder]

50% by mass aluminum-copper alloy powder was pulverized to adjust a grain size thereof. The preferred grain size of the aluminum-copper alloy powder is set so that the aluminum-copper alloy powder is powder having passed through 145 mesh and a ratio of powder having passed through a 350 mesh is 60% or more. The use of the aluminum-copper alloy powder extracts the effect of additives such as graphite, phosphorus, and zinc, and enables a sintered bearing material to be excellent in, for example, corrosion resistance, strength, and sliding characteristics. Further, the aluminum-copper alloy powder is alloy powder, and hence there is no problem of handing due to scattering of aluminum simple substance powder having a small specific gravity.

In the aluminum structure, an α-phase is most excellent in corrosion resistance with respect to sulfidation corrosion and organic acid corrosion, and initial conformability. When 50% by mass aluminum-copper alloy powder is used, even when graphite is added, the strength is obtained, and a sintered bearing can be manufactured. When the structure is a Y-phase, although excellent abrasion resistance is obtained, corrosion resistance and initial conformability are degraded.

In addition, in order to accelerate the sintering of copper and aluminum, phosphorus alloy powder, zinc alloy powder, and a fluoride (aluminum fluoride, calcium fluoride) are added. Thus, the diffusion of aluminum with respect to copper is enhanced during liquid-phase sintering and solid-phase sintering. When the diffusion of aluminum is accelerated, corrosion resistance is enhanced.

[Phosphorus Alloy Powder]

AS the phosphorus alloy powder, in the same way as in the first and second embodiments, 8% by mass phosphorus-copper alloy powder was used. Phosphorus has effects of enhancing wettability between a solid phase and a liquid phase during sintering and shifting a temperature for generation of a liquid phase caused by the addition of silicon powder to a low temperature side. It is preferred that the blending amount of phosphorus be from 0.05 to 0.5% by mass. When the blending amount of phosphorus is less than 0.05% by mass, the effect of accelerating the sintering between a solid phase and a liquid phase is unsatisfactory. On the other hand, when the blending amount of phosphorus is more than 0.5% by mass, the sintering proceeds excessively, and aluminum is segregated to increase Y-phase precipitation, with the result that a sintered compact becomes brittle.

[Zinc Alloy Powder]

As the zinc alloy powder, zinc-copper alloy powder was used. Zinc has a low melting point, accelerates the sintering of copper and aluminum, and also accelerates the diffusion of aluminum. Further, zinc is excellent in corrosion resistance.

It is preferred that the blending amount of zinc be from 1% by mass to 5% by mass. When the blending amount of zinc is less than 1% by mass, the effects of accelerating the sintering of copper and aluminum and accelerating the diffusion of aluminum are not obtained. On the other hand, when the blending amount of zinc is more than 5% by mass, zinc evaporates to contaminate a sintering furnace during sintering, and sintering proceeds excessively, with the result that aluminum is segregated and the diffusion of aluminum is inhibited.

[Silicon Powder]

Silicon is added as the sintering aid. Silicon generates a copper silicon-based liquid phase with respect to a phase of inhibiting the progress of sintering formed during the sintering step and accelerates the sintering. Silicon can accelerate the diffusion of aluminum during the sintering step to reduce the amount of aluminum, thereby reducing a Y-phase. It is preferred that the blending amount of silicon be from 0.5 to 3% by mass. When the blending amount of silicon is less than 0.5% by mass, the effect of accelerating the diffusion of aluminum during the sintering step is insufficient, and along with this, the effect of reducing a Y-phase becomes insufficient. On the other hand, when the blending amount of silicon is more than 3% by mass, silicon reacts during an increase in temperature of sintering to oxidize aluminum in black, which causes inconvenience of discoloration.

[Graphite Powder]

Graphite is present mainly as free graphite in pores dispersed and distributed in a substrate and contributes to the enhancement of abrasion resistance by imparting excellent lubricity to a sintered bearing. It is preferred that the blending amount of graphite be from 1 to 5% by mass with respect to a total of 100% by mass of aluminum, silicon, tin, phosphorus, copper, and inevitable impurities. When the blending amount of graphite is less than 1% by mass, the effects of enhancing lubricity and abrasion resistance by the addition of graphite cannot be obtained. On the other hand, it is not preferred that the blending amount of graphite be more than 5% by mass, because the strength is decreased.

[Aluminum Fluoride and Calcium Fluoride]

Aluminum fluoride and calcium fluoride are the same as those of the second embodiment, and hence the repeated descriptions thereof are omitted.

The metal structure of a cross-section of the sintered bearing according to the third embodiment is also the same as those of the first and second embodiments illustrated in the schematic view of FIG. 2. Therefore, only main portions are described, and the repeated description of the remaining portions is omitted. In the sintered bearing 1 according to the third embodiment, as illustrated in FIGS. 2(a), 2(b), and 2(c), an aluminum-copper alloy structure 3 is a hatched portion, and an aluminum oxide film 4 is present on a surface and around an inner pore. Therefore, the aluminum-copper alloy structure is excellent in corrosion resistance and abrasion resistance. Although not shown, in a grain boundary portion of the aluminum-copper alloy structure 3, phosphorus is present. Free graphite 5 is distributed in the pore, and hence the aluminum-copper alloy structure is excellent in lubricity and abrasion resistance.

Further, in the sintered bearing 1 according to the third embodiment as well, as illustrated in FIG. 7, both the radially outer surface 1b of the bearing and the bearing surface 1a on the radially inner side are subjected to sizing processing after sintering. An aluminum copper-based sintered bearing expands by sintering, and hence the radially outer surface 1b of the bearing is sized in an amount larger than that of the bearing surface 1a on the radially inner side. Therefore, the pores do (see FIG. 2(c)) in the surface layer portion on the radially outer surface 1b side are more crushed than the pores db (see FIG. 2(a)) in the surface layer portion on the bearing surface 1a side. When the pore do in the surface layer portion on the radially outer surface 1b side, the pore db in the surface layer portion on the bearing surface 1a side, and the pore di (see FIG. 2(b)) in the bearing that is not crushed are compared to each other in terms of size, a relationship of do<db<di is satisfied. By virtue of this relationship, corrosion resistance and oil film formation property can be enhanced on the bearing surface 1a side. On the other hand, on the radially outer surface 1b side and on the end surface 1c side close to a closed state, corrosion resistance and oil holding property can be enhanced. The pores do, db, and di of the sintered bearing 1 are impregnated with lubricating oil. Thus, a satisfactory lubrication state can be obtained from the beginning of an operation. As the lubricating oil, mineral oil, poly-α-olefin (PAO), an ester, liquid grease, or the like can be used. Note that, it is not necessarily required to impregnate those pores with the lubricating oil depending on the use purpose of a bearing.

Further, the state of the compressed layer of the surface layer of the sintered bearing 1 according to the third embodiment is also the same as that of the sintered bearing according to each of the first and second embodiments illustrated in FIG. 1. That is, as illustrated in FIG. 1, in the sintered bearing 1 according to the third embodiment as well, the surface layer of the sintered bearing 1 includes a hatched compressed layer. According to the above-mentioned expression of the density ratio α, a density ratio αo of a compressed layer Po in the surface layer on the radially outer surface 1b side and a density ratio αb of a compressed layer Pb in the surface layer on the bearing surface 1a side are both higher than a density ratio αi of the inside, and both of the density ratios αo and αb are set in a range of 80%≤αo and αb≤95%.

In addition, when an average value of depths of the compressed layer Po in the surface layer on the radially outer surface 1b side is defined as To, an average value of depths of the compressed layer Pb in the surface layer on the bearing surface 1a side is defined as Tb, and ratios of To and Tb to the inner diameter dimension D1 of the bearing surface are defined as To/D1 and Tb/D1, respectively, To/D1 and Tb/D1 are set to 1/100≤To/D1 and Tb/D1≤1/15.

The manufacturing method according to the third embodiment is also the same as the manufacturing method for a sintered bearing according to each of the first and second embodiments illustrated in FIG. 3. Therefore, only differences of specific contents in the raw material powder preparation step S1, the sintering step S3, and the sizing step S4 are described.

[Raw Material Powder Preparation Step S1]

Raw material powder was prepared by adding a total of 0.05 to 0.2% by mass of aluminum fluoride and calcium fluoride serving as the sintering aid, 1 to 5% by mass of graphite powder, and 0.5% by mass of a lubricant such as zinc stearate or calcium stearate for enhancing forming ability to a total of 100% by mass of a remaining % by mass of electrolytic copper powder, 14 to 20% by mass of 40 to 60% by mass aluminum-copper alloy powder, 2 to 4% by mass of 8% by mass of phosphorus-copper alloy powder, 1 to 3% by mass of silicon powder, and 6 to 8% by mass of 20 to 40% by mass zinc-copper alloy powder.

[Sintering Step S3]

What is important in the sintering step is to enhance corrosion resistance by sufficiently diffusing aluminum into copper, and to enhance corrosion resistance and bearing performance (initial conformability) by setting an aluminum structure to an α-phase. When the aluminum structure is a Y-phase, although abrasion resistance is excellent owing to the enlarged hardness, corrosion resistance is degraded. Therefore, it was found that it was necessary to reduce the amount of aluminum so as to minimize the precipitation of a Y-phase.

As the sintering condition satisfying the foregoing, it is preferred that the sintering temperature be from 900 to 950° C. Further, in a sintered bearing for a fuel pump, it is preferred that the sintering temperature be from 900 to 920° C. (for example, 920° C.). Further, as atmospheric gas, hydrogen gas, nitrogen gas, or mixed gas hereof is used. As the sintering time is longer, corrosion resistance becomes more satisfactory, and in a sintered bearing for a fuel pump, the sintering time is preferably 20 to 60 minutes (for example, 30 minutes).

[Sizing Step S4]

Also in the manufacturing method for a sintered bearing according to the third embodiment, in the same way as in the first and second embodiments, as illustrated in FIG. 6, the radially inner side of the sintered compact 1" is shaped by the core 23 by compressing the sintered compact 1" from both sides in the axial direction and the radially outer side with the punches 21, 22 and the die 20 during a sizing step. Thus, the sintered bearing 1 can be subjected to dimension shaping and desired pores can be formed through effective use of the expansion of an aluminum bronze-based sintered bearing by sintering. Further, the size of each pore on the surface of the sintered compact 1" can be set by adjusting a dimension difference between the inner diameter dimension of the die 20 and the outer diameter dimension of the sintered compact 1" and a dimension difference between the outer diameter dimension of the core 23 and the inner diameter dimension of the sintered compact 1". Thus, the size of each pore on the surface of the sintered bearing 1 can be controlled easily. Further, although not shown, each pore of the bearing surface 1*a* can be reduced in size by subjecting the bearing surface 1*a* (see FIG. 7) to rotation sizing.

The sintered bearing based on the manufacturing method according to the third embodiment has enhanced corrosion resistance, mechanical characteristics such as strength and abrasion resistance, oil film formation property, and oil holding property, and can also achieve compactness and reduction in cost. In particular, in a sintered bearing for a fuel pump, sulfidation corrosion and organic acid corrosion caused by gasoline of inferior quality are suppressed, and excellent performance such as initial conformability and durability are realized.

As the purpose of the sintered bearings according to the above-mentioned embodiments, a fuel pump has been illustrated. However, the purpose is not limited thereto. For example, the present invention can be appropriately applied to bearings required to have corrosion resistance, such as an exhaust gas recirculation device (EGR) and a fishing reel.

In the above-mentioned description of each embodiment, the case where the present invention is applied to a perfect circular bearing having the bearing surface 1*a* in a perfect circle shape has been illustrated. However, the present invention can be similarly applied to a fluid dynamic bearing in which a dynamic pressure generation portion such as a herring-bone groove or a spiral groove is provided on the bearing surface 1*a* and an outer circumferential surface of the shaft 2, as well as the perfect circular bearing.

The present invention is not limited to the above-mentioned embodiments. As a matter of course, various modifications can be made thereto without departing from the gist of the present invention. The scope of the present invention is defined in claims, and encompasses equivalents described in claims and all changes within the scope of claims.

DESCRIPTION OF REFERENCE SIGNS

1 sintered bearing
1' green compact
1" sintered compact
1*a* bearing surface
1*b* radially outer surface
1*c* end surface
2 shaft
3 aluminum-copper alloy structure
4 aluminum oxide film
5 free graphite
15 mesh-belt type continuous furnace
20 die
21 upper punch
22 lower punch
23 core
40 fuel pump
D1 inner diameter dimension of bearing surface
db pore
di pore
do pore
Ti compressed layer
To compressed layer

The invention claimed is:

1. A manufacturing method for a sintered bearing comprising 3 to 12% by mass of aluminum, 0.05 to 0.5% by mass of phosphorus, and the balance comprising copper as a main component, and inevitable impurities,
the sintered bearing having a bearing surface on an inner circumference and a radially outer surface,
the sintered bearing having compressed layers on the entire radially outer surface and the entire bearing surface, respectively,
a density ratio ao of the compressed layer on a radially outer surface side being $80\% \leq a_o \leq 95\%$, and a density ratio ab of the compressed layer on a bearing surface side being $80\% \leq a_b \leq 95\%$,
when an average value of depths of the compressed layer on the radially outer surface side is defined as To, an average value of depths of the compressed layer on the bearing surface side is defined as Tb, and ratios of To and Tb to an inner diameter dimension D1 of the bearing surface are defined as To/D1 and Tb/D1, respectively, To/D1 is set to $\frac{1}{100} \leq \text{To/D1} \leq \frac{1}{15}$ and Tb/D1 is set to $\frac{1}{100} \leq \text{Tb/D1} \leq \frac{1}{15}$,
the manufacturing method comprising at least:
a green compact forming step of forming a green compact in which a sintering aid is added to raw material powder;
a sintering step of obtaining, from the green compact, a sintered compact having a structure in which an aluminum-copper alloy is sintered; and
a sizing step of subjecting the sintered compact to dimension shaping and forming the compressed layer on the radially outer surface side and the compressed layer on the bearing surface side.

2. The manufacturing method for a sintered bearing according to claim 1, wherein the sintered bearing has added thereto, as the sintering aid, a total of 0.05 to 0.2% by mass of aluminum fluoride and calcium fluoride with respect to a total of 100% by mass of the raw material powder comprising aluminum, phosphorus, and the balance comprising copper as a main component, and the inevitable impurities.

3. The manufacturing method for a sintered bearing according to claim 1, wherein the copper in the raw material powder comprises electrolytic copper powder as a main component.

4. The manufacturing method for a sintered bearing according to claim 1, wherein the sintered bearing has added thereto 1 to 5% by mass of graphite with respect to a total of 100% by mass of the raw material powder and the inevitable impurities.

5. The manufacturing method for a sintered bearing according to claim 1, wherein: a form in the sizing step comprises a die, a pair of punches, and a core; and
the sizing step comprises compressing the sintered compact from both sides in an axial direction and a radially outer side with the punches and the die to shape a radially inner side of the sintered compact with the core.

6. The manufacturing method for a sintered bearing according to claim 1, wherein the sizing step comprises setting a size of a pore on a surface of the sintered compact by adjusting a dimension difference between an inner diameter dimension of a die and an outer diameter dimension of the sintered compact and a dimension difference between an outer diameter dimension of a core and an inner diameter dimension of the sintered compact.

7. The manufacturing method for a sintered bearing according to claim 1, wherein the sintering step comprises using a mesh-belt continuous furnace.

8. The manufacturing method for a sintered bearing according to claim 1, wherein a sintering temperature of the sintering step is from 850 to 950° C.

9. The manufacturing method for a sintered bearing according to claim 1, wherein: a sintering atmosphere of the sintering step comprises a reducing atmosphere;

and a sintering time of the sintering step is from 10 to 60 minutes.

10. The manufacturing method for a sintered bearing according to claim 1, wherein
the sintering aid includes aluminum fluoride and calcium fluoride, and
the green compact is sintered in a case.

11. The manufacturing method for a sintered bearing according to claim 2, wherein
the sintering aid includes aluminum fluoride and calcium fluoride, and
the green compact is sintered in a case.

12. The manufacturing method for a sintered bearing according to claim 3, wherein
the sintering aid includes aluminum fluoride and calcium fluoride, and
the green compact is sintered in a case.

13. The manufacturing method for a sintered bearing according to claim 4, wherein
the sintering aid includes aluminum fluoride and calcium fluoride, and
the green compact is sintered in a case.

14. The manufacturing method for a sintered bearing according to claim 5, wherein
the sintering aid includes aluminum fluoride and calcium fluoride, and
the green compact is sintered in a case.

15. The manufacturing method for a sintered bearing according to claim 6, wherein
the sintering aid includes aluminum fluoride and calcium fluoride, and
the green compact is sintered in a case.

16. The manufacturing method for a sintered bearing according to claim 7, wherein
the sintering aid includes aluminum fluoride and calcium fluoride, and
the green compact is sintered in a case.

17. The manufacturing method for a sintered bearing according to claim 8, wherein
the sintering aid includes aluminum fluoride and calcium fluoride, and
the green compact is sintered in a case.

18. The manufacturing method for a sintered bearing according to claim 9, wherein
the sintering aid includes aluminum fluoride and calcium fluoride, and
the green compact is sintered in a case.

* * * * *